US007367755B2

United States Patent
Würfels et al.

(10) Patent No.: US 7,367,755 B2
(45) Date of Patent: May 6, 2008

(54) CUTTING ELEMENT

(75) Inventors: Andreas Würfels, Köln (DE); Günter Ruther, Marl (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 33 days.

(21) Appl. No.: 10/573,531

(22) PCT Filed: Sep. 24, 2004

(86) PCT No.: PCT/DE2004/002144

§ 371 (c)(1),
(2), (4) Date: Mar. 24, 2006

(87) PCT Pub. No.: WO2005/039806

PCT Pub. Date: May 6, 2005

(65) Prior Publication Data
US 2007/0034063 A1    Feb. 15, 2007

(30) Foreign Application Priority Data
Oct. 8, 2003    (DE)    ................ 103 46 790

(51) Int. Cl.
*B23B 27/00*    (2006.01)
(52) U.S. Cl. ................ 407/113; 407/114; 407/115
(58) Field of Classification Search ........ 407/113–116, 407/101, 103
See application file for complete search history.

(56) References Cited

U.S. PATENT DOCUMENTS

| | | | | |
|---|---|---|---|---|
| 4,648,760 A | * | 3/1987 | Karlsson et al. | 408/223 |
| 4,859,122 A | * | 8/1989 | Patterson et al. | 407/114 |
| 5,203,648 A | * | 4/1993 | Bohannan et al. | 407/113 |
| 6,065,907 A | * | 5/2000 | Ghosh et al. | 407/114 |
| 6,234,726 B1 | * | 5/2001 | Okada et al. | 407/114 |
| 6,527,486 B2 | * | 3/2003 | Wiman et al. | 408/188 |
| D488,176 S | * | 4/2004 | Kasperik et al. | D15/139 |
| 6,848,868 B2 | * | 2/2005 | Kasperik | 407/114 |
| 6,957,935 B2 | * | 10/2005 | Sung et al. | 407/113 |
| 7,101,121 B2 | * | 9/2006 | Wermeister et al. | 407/113 |
| 7,182,555 B2 | * | 2/2007 | Kitagawa et al. | 407/113 |
| 2001/0014259 A1 | * | 8/2001 | Inayama | 407/116 |
| 2005/0019111 A1 | * | 1/2005 | Kitagawa et al. | 407/113 |

* cited by examiner

*Primary Examiner*—Monica Carter
*Assistant Examiner*—Sara Addisu
(74) *Attorney, Agent, or Firm*—Andrew Wilford

(57) ABSTRACT

A cutting element for the machining of metallic workpieces has a body formed with an upper and a lower face of which at least one is designed as a mounting face, and a side face that connects the upper and the lower faces, that is perpendicular thereto, and that together with the upper and lower faces forms cutting edges usable for machining. Each cutting edge has two parallel long straight cutting-edge sections and two parallel short straight cutting-edge sections. Cutting corners connect respective adjacent long and short cutting-edge sections. One part of each long straight cutting-edge section is recessed parallel to the side faces by a distance in relation to the adjacent edge sections as well as indented perpendicular to the side faces by a distance.

20 Claims, 5 Drawing Sheets

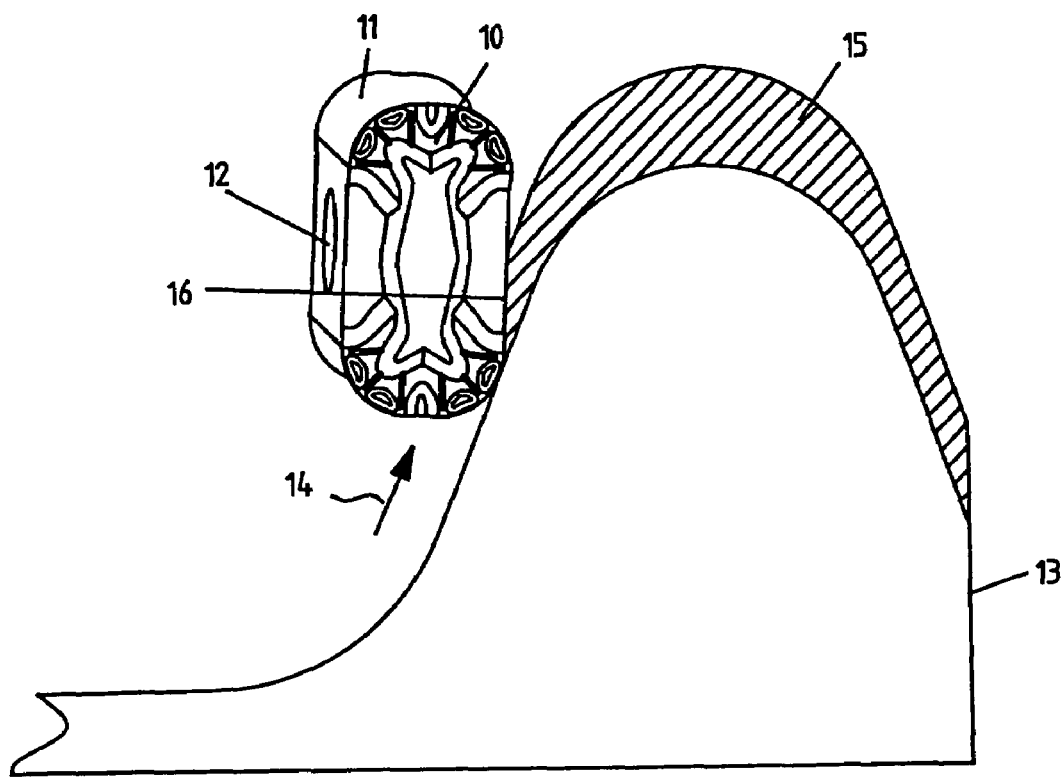
FIG.1 - Prior Art -

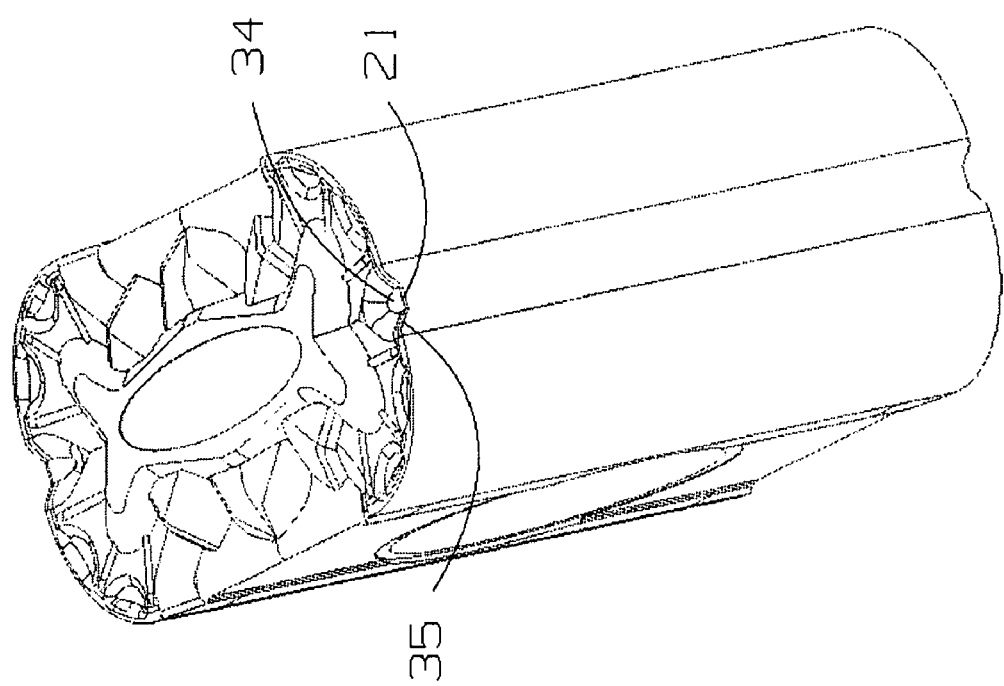

CUTTING ELEMENT

CROSS REFERENCE TO RELATED APPLICATIONS

This application is the U.S. national phase of PCT application PCT/DE2004/002144, filed 24 Sep. 2004, published 6 May 2005 as WO 2005/039806, and claiming the priority of German patent application 10346790.4 itself filed 8 Oct. 2003, the entire disclosures of which are herewith incorporated by reference.

FIELD OF THE INVENTION

The invention relates to a cutting element for the machining of metallic workpieces, in particular of wheel sets, having an upper and a lower face, of which at least one, preferably both, are designed as mounting faces, and having a side face that connects the upper and the lower face and that is perpendicular to them, that forms, together with the face, cutting edges usable for machining that have long straight cutting-edge sections that extend parallel to each other and short straight cutting-edge sections as well as cutting corners that connect respective adjacent long and short cutting-edge sections.

Such cutting elements correspond to the norm DIN 4987LNUX. The advantage of such cutting elements is that they can be used for combined longitudinal and transverse turning due to the existing long cutting edges and the short cutting edges, of which adjacent ones are connected with each other by a cutting corner. However, the chip formation in the embodiments known in the prior art is not always satisfying. Particularly in turning, chips are often formed with insufficient thicknesses, creating the disadvantage that the chips break poorly, which in extreme cases can lead to a dangerous formation of snarl chips. Indeed, it is possible to increase the thickness of the chip by means of the advance of the tool to some degree, however, thereby the machining forces that operate on the cutting edge increase, which can result in an undesired premature wear of the cutting edge to the point of the breaking of the cutting edge.

OBJECT OF THE INVENTION

Hence, an object of the present invention is to provide a cutting element that have es a high cutting-edge stability and that allows as well machining with sufficient chip thickness, in particular in the machining of wheel sets or other coarse machining works due to the new design.

SUMMARY OF THE INVENTION

This object is attained by the cutting element for the machining of metallic workpieces, in particular of wheel sets, having a body formed with an upper and a lower face of which at least one, preferably both, are designed as mounting faces, and having a side face that connects the upper and the lower faces, that is perpendicular thereto, and that, together with the faces, forms cutting edges usable for machining, that have long straight cutting-edge sections extending parallel to each other, short straight cutting-edge sections also extending parallel to each other, and cutting corners that connect respective adjacent long and short cutting-edge sections. According to the invention, at least one part of the long straight cutting-edge sections is recessed by a distance (a) in relation to the adjacent edge sections as well as indented by a distance (b). The distance (a) of the recessing is $0.01 \times H$ to $0.2 \times H$, preferably $0.02 \times H$ to $0.1 \times H$, where H is the total height of the cutting element, the distance (b) of the indentation is $0.005 \times B$ to $0.1 \times B$, preferably $0.008 \times B$ to $0.05 \times B$, where B is the total width of the cutting element. The recessing is to be understood in relation to the cutting-edge plane, in relation to which this part of the long cutting-edge sections is disposed such that it is displaced in the height. It is substantial for the present invention that at least one part of the long straight cutting-edge section is both recessed and indented, i.e. that this arrangement differs, due to the combination of both mentioned features, from embodiments known in the prior art, that in part exclusively disclose recessing of cutting edges, such as by indentations, that penetrate the cutting edge or cutting edges with cutting-edge sections of different heights that are connected by transition areas. Surprisingly, it was found that the combination of the recessing as well as the indentation of a cutting-edge part in turning, where this part is used as an active cutting edge, enables the formation of a chip which breaks substantially more easily than for example possible with a straight cutting edge. In particular, the chip is curved according to the shape of the cutting edge of the long cutting edge as it is being detached also in cross section, which enables easier breaking of the chip.

Thus, preferably the indented and recessed part of the cutting-edge section is—apart from transition areas—parallel to adjacent cutting-edge sections. Ascending flank sections abut the indented and recessed cutting-edge sections as transition areas, respectively preferably at an angle of 10° to 90°, preferably of 40° to 50°. These flank sections serve for the formation of a chip that is curved in cross section.

Preferably, the cutting-edge corners each have a corner radius (R) of $0.05 \times B$ to $0.5 \times B$, preferably of $0.1 \times B$ to $0.4 \times B$, wherein B corresponds to the total width of the cutting element.

According to another design and as known in principle from the prior art, the cutting element preferably has a center plateau that is raised from the face relative to the planes defined by the cutting edges and that is offset at a distance from the cutting edges. In embodiments in which faces are provided on both the upper and the lower side, the respective center plateaus serve as support faces.

According to another design of the invention, the center plateau has projections whose longitudinal axes point toward a cutting corner or a short and/or long cutting-edge section. These projections serve as chip breakers that curve the chip being detached toward the "top" and thus make it break. In particular favorable for the breaking of the chip are center plateaus that merge into the face areas via surrounding descending flanks. These descending flanks form ascending flanks for curving up the chip that is being detached.

Further measures for forming and guiding the chip are realized by rib-shaped elevations disposed symmetrically to a bisecting line of a cutting corner or lying in its direction in the face and the height of which is less than that of the center plateau. These rib-shaped elevations can reach directly to this descending flank of the center plateau or, respectively, abut on it or end in front of this flank area. The rib-shaped elevations end on the other side at a spacing from the cutting edge or of a phase that is provided there.

According to another embodiment of the invention, further projections can originate from the center plateau that point toward the long cutting-edge sections and/or that are of a less height than the center plateau. Preferably, these further projections merge into the adjacent surrounding face areas via descending flanks and/or are designed crowned, i.e. convex.

According to another embodiment of the invention, also the short cutting-edge section can be recessed centrally at a part that merges via ascending flanks into the adjacent cutting-edge sections. The cutting edge thus has es only one recess in this area. In addition to the rib-shaped elevations that have already been described, also grooves can be provided as chip-breaking elements at a spacing from the cutting edge, that are in particular designed in a sickle-shape on the face.

Alternatively or additionally to the rib-shaped chip-breaking elements, chip-breaking elements can also be provided that are trapezoidal in the cross section and are separated from the cutting edge by a spacing that increases as height increases, that reach preferably to the center plateau. These raised chip-breaking elements extend as wedges toward the cutting edge and constitute a kind of "seizing ramp" for the chip that is detached, by means of which the chip gets a certain pre-curvature until it meets the ascending ramps of the center plateau.

According to another design of the invention, the cutting elements are mirror-symmetrical to a longitudinal center axis and/or a transverse center axis and/or a diagonal, so that every face is usable for counterclockwise as well as for clockwise turning or, respectively, as an indexable insert (by means of a rotation of 180° of the cutting element). When the upper and lower face also serve as mounting faces, a further mirror symmetry relative to a longitudinal center plane results or a cutting element that has es two usable faces with respective pairs of long and short cutting-edge sections.

BRIEF DESCRIPTION OF THE DRAWING

Further advantages and examples of designs of the invention will be explained on the basis of the drawings, wherein FIG. 1 shows a schematic view of a cutting element known in the prior art with a recessed cutting-edge area during turning of a wheel set profile.

SPECIFIC DESCRIPTION

Figure 2:
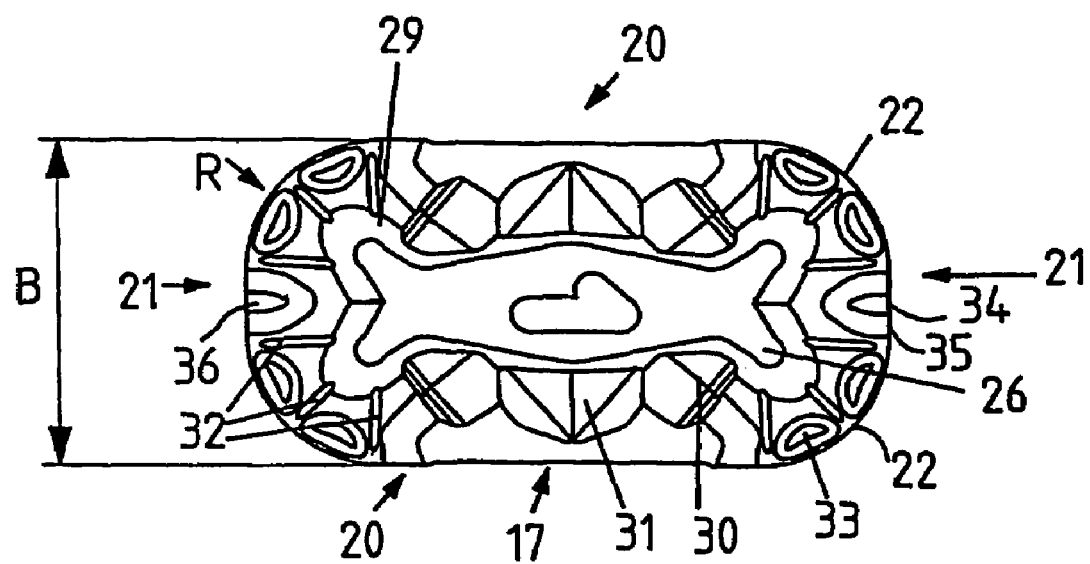
FIG. 2 shows a top view of a cutting element with an indented, but not recessed cutting-edge area.

As it is evident from FIGS. 1 to 4, the shown prior-art cutting elements have at least one face 10, preferably two faces 10 that are parallel to each other and that at a spacing on opposite sides. These two faces 10 are connected with each other via a side face 11 that is perpendicular to them. For mounting the cutting element, a through bore 12 is provided that penetrates the side faces 11 on opposite sides. This bore 12 serves for the reception of a tensioning element by means of which the cutting element is fixed in a (tool post) die carrier.

FIG. 1 shows the use of the cutting element in the turning of a wheel set 13, where the cutting element is guided in the direction of arrow 14. The material 15 that is to be machined off is indicated by hatching. In the shown example, the long-cutting edge is partially recessed but not indented so that seen from the top, a straight course of the active cutting-edge section 16 results. Due to the additional indentation according to the invention of the center part of the long cutting edge, that will be described below, a course of the cutting edge results in combination with the transition area that is angled, seen from the top view in relation to that, that leads, in combination with the course of the cutting edge that is caused by the recessing, to the fact that the detached chip receives in cross section S-shaped curvatures in directions that are orthogonal to each other, due to which the chip can break more easily.

FIG. 2 shows in a top view an indented cutting-edge section 17, that is formed by indenting back the adjacent free surface in this area. As can further be seen from FIG. 3, the indented area 17 as well as the recessed area combine to form a cutting-edge section 18 in a particular embodiment, wherein the areas of the recessing of the cutting edges (in relation to the plane of the face or, respectively, parallel thereto) as well as the indentations (by setting back the free areas) completely overlap. The free area that is set back is marked by reference 19.

Figure 3:
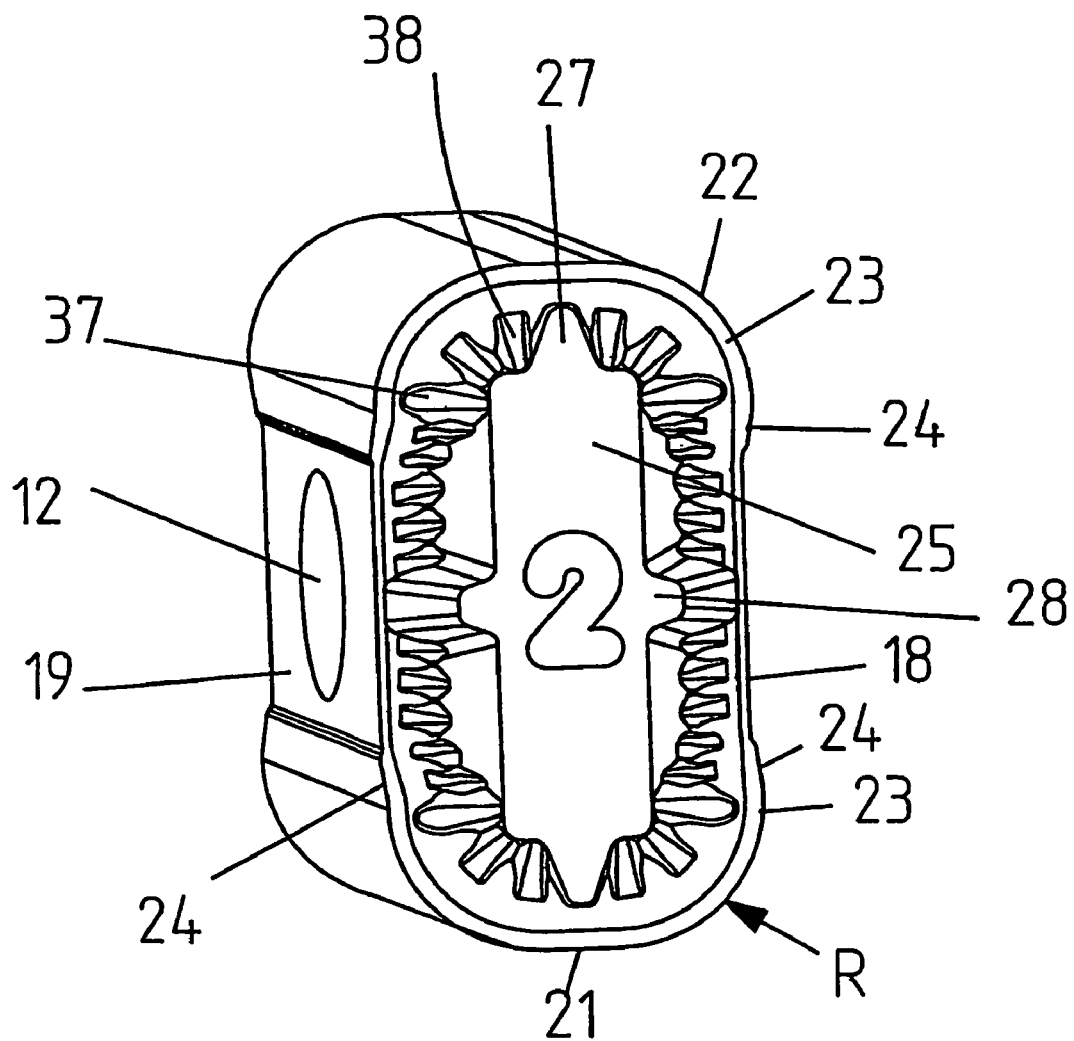
FIG. 3 shows a cutting element according to the present invention that has an indented and recessed cutting-edge area.
Figure 4:
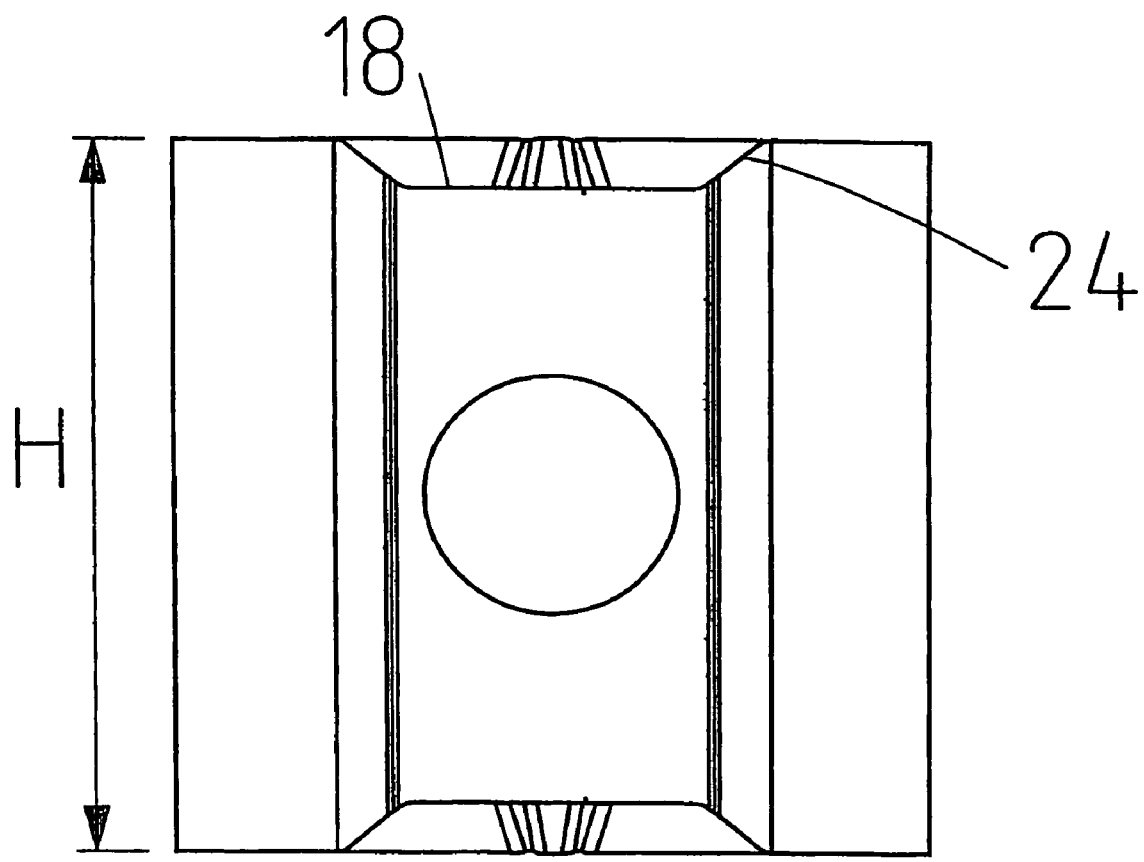
FIG. 4 shows a front view of this cutting element toward the recessed and indented cutting edge.

As can be seen from FIGS. 2 to 4, the cutting element has es long straight cutting-edge sections 20 that are parallel to each other as well as short straight cutting-edge sections 21 that result in a longitudinal oval shape of the edges in a top view with cutting corners 22 that connect respective adjacent cutting-edge sections 20 and 21. A part of the long cutting edge 20 is, in an area 18, both recessed and indented. The respective flanking cutting-edge parts 23, which are relatively short in the embodiment according to FIG. 3, are parallel to the recessed and indented cutting-edge section 18. At both ends, ascending flank sections 24 abut the indented and recessed cutting-edge sections 18 as transition areas at an angle of 10° to 90°, preferably of 40° to 50°.

On the faces, different embossed or groove-shaped chip-breaking elements can be used as known in the prior art. As well, it is recommended to select on opposite sides designs of faces that have a center plateau 25 that serves at the rotation center of the cutting element as a support face in a cutting plate fit. This face plateau 25 can have be shaped as shown in FIG. 2 or 3 or otherwise. In particular, the plateau 25 can have projections 26 whose longitudinal center axes point toward a respective cutting corner 22. Alternatively, also projections 27 and/or 28 (see FIG. 3) can be used that point toward the center of the cutting edge of a short or long edge section. These projections can have edges that are rounded at the top or have also trapezoidal shapes. Preferably, these projections or also other areas of the plateau merge into the adjacent surrounding face areas via descending flanks 29 (see FIG. 2). The flank angle of the descending flanks 29 can for example be between 45° and 60° (relative to the cutting plateau plane). If needed, further projections 30 or 31 of lesser height than that of the face plateau, can be provided. These projections 30 or 31, as well as raised ribs 32, if necessary having sickle-shaped grooves 33 between two ribs 32, serve as chip-breaking elements. As is evident from FIG. 2, the short cutting edge 21 can also have a recessed area 34 with ascending flanks 35 on both sides. Such design is achieved by means of recessing an area 36 of the face that tapers away from the cutting edge.

In the same manner, and as shown in the example of the cutting element according to FIG. 3, chip-breaking elements 37 or 38 can be provided that are trapezoidal in cross section and that have a height that increases as the spacing from the respective cutting edge increases, so that a "seizing ramp" for the chip that is detached results in this area. These chip-breaking elements 37 and 38 end on the ascending flanks of the center plateau 25, but have however a smaller height.

As shown schematically in FIG. 3, the borders that limit the plateau 25 can have partially straight areas, curved areas, formed both convex and concave, or other combinations of curved and/or straight parts.

The invention claimed is:

1. A cutting element for the machining of metallic workpieces having a body formed with
    an upper and a lower face of which at least one is designed as a mounting face, and
    a side face that connects the upper and the lower faces, that is perpendicular thereto, that together with the upper and lower faces forms cutting edges usable for machining and having long straight cutting-edge sections that extend parallel to each other and short straight cutting-edge sections that extend parallel to each other as well as cutting corners that connect respective adjacent long and short cutting-edge sections, at least one part of each long straight cutting-edge section being recessed parallel to the side faces by a distance in relation to the adjacent edge sections as well as indented perpendicular to the side faces by a distance.

2. The cutting element according to claim 1 wherein relative a total height (H) and a total width (B) of the cutting element, the distance of the recessing is 0.01×H to 0.2×H, and the distance of the indentation is 0.005×B to 0.1×B.

3. The cutting element according to claim 2 wherein the distance of the recessing is 0.02×H to 0.1×H.

4. The cutting element according to claim 2 wherein the distance of the indentation is 0.008×B to 0.05×B.

5. The cutting element according to claim 1 wherein the indented and recessed part of the long cutting-edge section extends—except in transition areas—parallel to adjacent cutting-edge sections.

6. The cutting element according to claim 1 wherein ascending flank sections abut on the indented and recessed cutting-edge sections as transition areas at an angle of 10° to 90°.

7. The cutting element according to claim 6 wherein the angle is 40° to 50°.

8. The cutting element according to claim 1 wherein the cutting-edge corners have a corner radius of 0.05×B to 0.5×B, wherein B is the total width of the cutting element.

9. The cutting element according to claim 8 wherein the radius is 0.1×B to 0.4×B.

10. The cutting element according to claim 1 wherein the body is further formed with
    a respective center plateau that is raised on each of the upper and lower faces relative to planes defined by the cutting edges and disposed at a spacing from the cutting edges.

11. The cutting element according to claim 10 wherein each center plateau has projections having longitudinal center axes that point toward a respective cutting corner or toward a short or long cutting-edge section.

12. The cutting element according to claim 10 wherein the center plateaux each merge via descending flanks into face areas adjacent to and surrounding the center plateaux.

13. The cutting element according to claim 10 wherein the body is further formed with
    ribs disposed symmetrically to a bisecting line of the cutting corners in the upper and lower face or extending toward the corners, the height of the ribs being less than the height of the center plateau, the ribs extending from the descending flanks of the center plateau to a location at a spacing from the cutting edge.

14. The cutting element according to claim 13 wherein, at a spacing from the cutting-edge, chip-breaking grooves are provided on the face that are of sickle-shape between two adjacent ribs.

15. The cutting element according to claim 10 wherein projections originate from the center plateau, that point toward the long cutting-edge sections and are of a smaller height than the center plateau.

16. The cutting element according to claim 15 wherein the projections merge via descending flanks into adjacent surrounding face areas or are crowned.

17. The cutting element according to claim 10 wherein chip-breaking elements are provided at a spacing from the cutting edge that are trapezoidal in cross section and have a height that increases as spacing from the cutting edge increases to a center plateau.

18. The cutting element according to claim 1 wherein the short cutting-edge section is recessed centrally at a straight part and merges from ends thereof via ascending flanks into the adjacent cutting-edge sections.

19. The cutting element according to claim 1 wherein the upper and lower faces have mirror symmetry relative to a longitudinal center axis or a transverse center axis or a diagonal.

20. The cutting element according to claim 1 wherein the upper and lower faces are disposed and designed such that they have mirror symmetry relative to a center longitudinal plane.

* * * * *